US009614691B2

United States Patent
Boenke

(10) Patent No.: US 9,614,691 B2
(45) Date of Patent: Apr. 4, 2017

(54) METHOD AND DEVICE FOR DETECTING AN UNOCCUPIED TRANSMISSION CHANNEL IN A MULTI-MEDIA TRANSMISSION SYSTEM

(75) Inventor: Bjoern Boenke, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 2367 days.

(21) Appl. No.: 12/305,724

(22) PCT Filed: Dec. 10, 2007

(86) PCT No.: PCT/EP2007/063606
§ 371 (c)(1),
(2), (4) Date: Aug. 2, 2010

(87) PCT Pub. No.: WO2008/071655
PCT Pub. Date: Jun. 19, 2008

(65) Prior Publication Data
US 2010/0287595 A1    Nov. 11, 2010

(30) Foreign Application Priority Data

Dec. 15, 2006 (DE) .......... 10 2006 059 354

(51) Int. Cl.
*H04N 7/18*      (2006.01)
*H04L 12/66*    (2006.01)
*H04N 21/214*  (2011.01)

(52) U.S. Cl.
CPC ......... *H04L 12/66* (2013.01); *H04N 21/2146* (2013.01)

(58) Field of Classification Search
CPC ................................ H04N 21/2146
See application file for complete search history.

(56) References Cited

U.S. PATENT DOCUMENTS 3,968,327 A * 7/1976 Gregg, III ...................... 725/85
5,422,668 A * 6/1995 Chanteau et al. ............ 725/151
(Continued)

FOREIGN PATENT DOCUMENTS

| DE | 10123842 | 12/2002 | |
| WO | WO 2005060252 A1 * | 6/2005 | ............. H04N 5/765 |
| WO | WO 2005/100919 | 10/2005 | |

OTHER PUBLICATIONS

International Search Report, PCT International Patent Application No. PCT/EP2007/063606, dated May 15, 2008.

*Primary Examiner* — Joshua Taylor
(74) *Attorney, Agent, or Firm* — Gerard Messina

(57) ABSTRACT

A method and a device for detecting an unoccupied transmission channel in a multi-channel transmission system having a plurality of transmission channels for an audio and/or video transmission, as it is frequently installed in seats of vehicles, trains, airplanes or in auditoriums and conference rooms. When expanding or modifying the transmission system, each receiving module until now had to be uninstalled and appropriately adapted in case of unoccupied transmission channels. This is very labor-intensive and costly. According to the invention, an encoding of the unoccupied transmission channels using an identification is provided, which is detectable by the receiving modules. Upon detection of the identification, the respective transmission channel is automatically blocked for the selection. A complicated disassembly and a corresponding manual adaptation of the receiving modules may therefore be dispensed with.

8 Claims, 1 Drawing Sheet

(56) References Cited

U.S. PATENT DOCUMENTS

| | | |
|---|---|---|
| 5,751,335 A | 5/1998 | Shintani |
| 6,249,913 B1* | 6/2001 | Galipeau et al. ............... 725/76 |
| 2003/0023984 A1* | 1/2003 | Cang et al. .................. 725/126 |
| 2004/0165589 A1 | 8/2004 | Tomich |
| 2006/0085812 A1* | 4/2006 | Shishegar et al. ............. 725/19 |
| 2007/0169150 A1* | 7/2007 | Woolgar ........................ 725/60 |

* cited by examiner

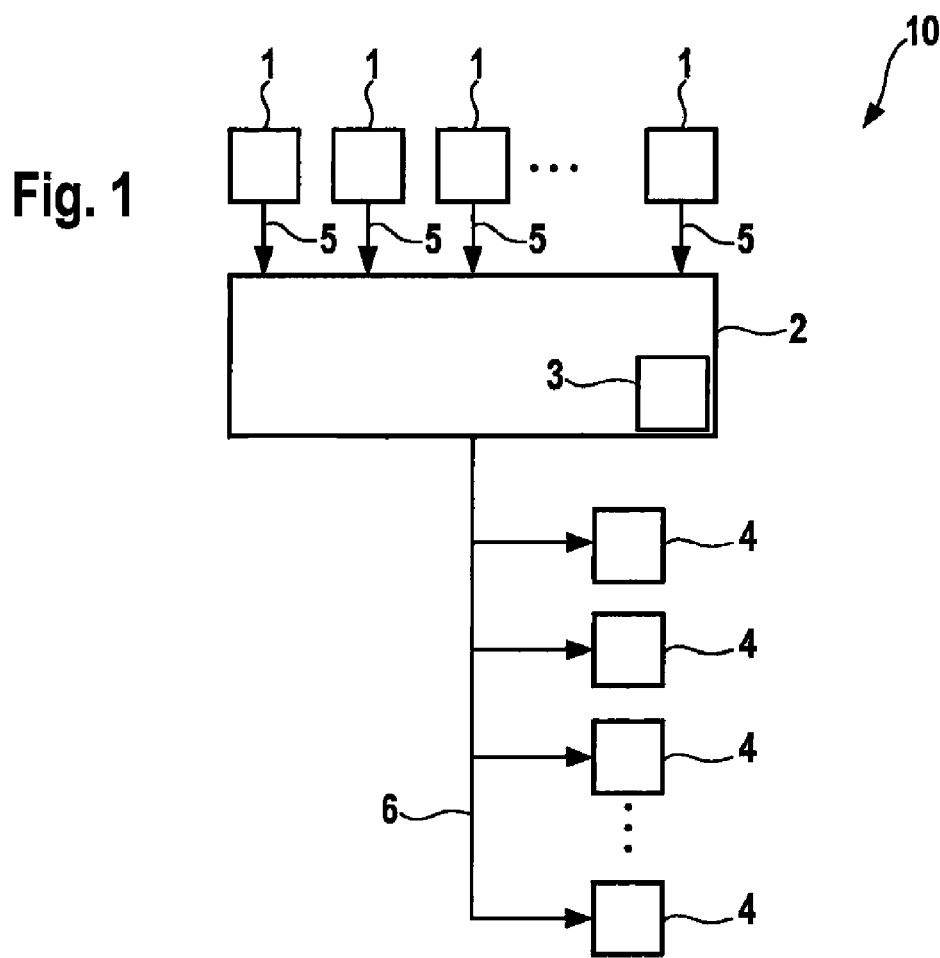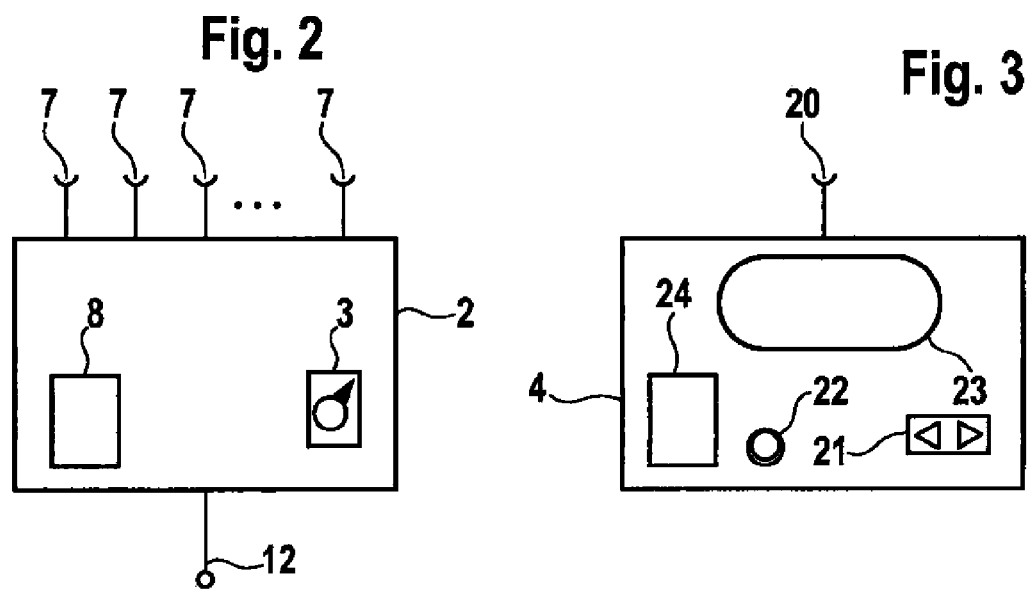

METHOD AND DEVICE FOR DETECTING AN UNOCCUPIED TRANSMISSION CHANNEL IN A MULTI-MEDIA TRANSMISSION SYSTEM

FIELD OF THE INVENTION

The present invention relates to a method and to a device for detecting a transmission channel not occupied by a useful signal in a multi-channel transmission system.

BACKGROUND INFORMATION

Conventionally, multi-channel transmission systems are used on buses, trains or airplanes, for example, especially in order to distribute audio programs to the individual seats of the occupants. Each seat is equipped with a receiving module, by which the individual transmission channels are able to be called up. Such a receiving module frequently has a rotary switch or push buttons with whose aid the available transmission channels may be called up in sequence in order to listen to or view a desired program. The number of transmission channels is flexible and generally depends on the design of the utilized multi-channel transmission system and the seats to be served. The transmission channels are controlled by a central unit to which various signal sources are connected. Depending on the number of utilized signal sources, e.g., radio receiver, CD player, tape players, microphones for announcements etc., not all available transmission channels are usually occupied by a separate signal source. If the different transmission channels are sampled at the receiving module (seat module), then a few transmission channels typically turn up on which no useful signal can be received. Conventionally, to remedy this, the seat modules are equipped with a hidden switch which a passenger is unable to operate. Via the switch, the number of transmission channels occupied by a useful signal is restricted to a specified maximum value.

However, a problem arises if the multi-channel transmission system must be modified later on because, for instance, one or several additional signal sources are to be connected or if one of the existing signal sources malfunctions and a provided transmission channel is therefore unable to be used. To remedy this problem, all seat modules must be disassembled and adapted to the current status of the available transmission channels with the aid of the hidden switch by a technician. This process is very labor-intensive and thus costly.

German Patent Application No. DE 101 23 842 A1 describes a system for controlling electrically controllable components in a motor vehicle. In this system a central control unit controls the various electrically controllable components installed in a motor vehicle with the aid of a corresponding module. The controllable vehicle components are connected to the central control unit via different bus systems and are able to communicate with it. The central control unit also includes a second module, by which infotainment components or multi-media components are controllable. A multitude of variants, from a simple basic setup to a high-end multi-media system, is meant to be offered by such a system.

SUMMARY

The present invention relates to simplifying the design of a multi-channel transmission system in such a way that only transmission channels occupied by a useful signal are able to be selected at the receiving module (seat module).

An example method or device according to the present invention may provide the advantage that for a multi-channel transmission system, especially for the transmission of audio and/or video signals at the receiving module (seat module), only the particular transmission channels actually occupied by a useful signal are selectable. Any transmission channels not occupied by a useful signal are automatically blocked. It is considered especially advantageous that the enabling of the usable transmission channels is automatically adapted if a modification of the multi-channel transmission system takes place, in which new transmission channels are added or existing transmission channels are no longer to be used. A complicated disassembly of the individual receiving modules and an adjustment to the new usable transmission channels is no longer required. This considerably reduces the work in connection with the updating of the multi-channel transmission system. More specifically, it is no longer necessary to have the transmission channels adapted at each seat by a highly skilled technician.

It may be especially advantageous if upon selection of a transmission channel occupied by useful data, the adjacent transmission channel will be checked in order to determine whether or not the adjacent transmission channel has already been assigned an identification. If no identification is detected, then the adjacent transmission channel is occupied by a useful signal so that it may be enabled for the next selection. However, if an identification is detected on the adjacent channel, then this transmission channel is no longer usable and will be blocked automatically.

Another advantageous refinement of the present invention is that it is also possible to continually and automatically check the particular next adjacent transmission channel if a transmission channel with an identification had been detected previously. This advantageously makes it possible to determine all usable or non-usable transmission channels in a very simple manner. In particular, further switching is prevented if no additional usable transmission channel is available, or all unused transmission channels are automatically skipped.

According to the example method of the present invention, each transmission channel not occupied by a useful signal is provided with an identification. A direct voltage or a direct-voltage signal is preferably used as identification. This direct-voltage signal is easy to detect since it clearly differs from the usual alternative-voltage frequencies of a useful signal. In the encoding, it is therefore determined only whether a direct-voltage component is present on the transmission channel to be checked. If a direct-voltage component is detected, then switching to this channel is suppressed or prevented.

To determine which transmission channel is currently selected and more specifically, which useful-signal source is received, a corresponding display is output on a display disposed on the receiving module. For example, a channel number and/or a program name, the signal source or the like may be output optically.

BRIEF DESCRIPTION OF THE DRAWINGS

An exemplary embodiment of the present invention is in the figures and explained in greater detail below.

FIG. 1 shows a schematic illustration of a circuit diagram of an example device in a multi-channel transmission system.

FIG. 2 shows a simplified block diagram of an example central unit according to the present invention.

FIG. 3 shows an example receiving module or seat module according to the present invention.

DETAILED DESCRIPTION OF EXAMPLE EMBODIMENTS

The block diagram of FIG. 1 shows a multi-channel transmission system 10 having a central unit 2. Via corresponding input terminals, a plurality of signal sources 1 is able to be connected to central unit 2. Connectable as signal sources 1 are, for example, radio receivers, magnetic tape devices, CD players, MP3 players, video recorders, one or more microphones, and similar devices. The type and number of signal sources 1 depends on the design of multi-channel transmission system 10. FIG. 1 shows four signal sources. At their outputs, the signal sources deliver a useful signal 5 that includes no direct-voltage component or which may be transmitted coupled to the alternating voltage. Useful signals 5 may contain audio and/or video signals. Useful signals 5 are routed to central unit 2 and forwarded from there via a random number of transmission channels to receiver module 4 with the aid of a multiplex signal 6. Central unit 2 has the task of providing each receiving module 4 (seat module) with the useful signals on the individual transmission channels via multiplex signal 6.

For instance, the useful signals are transmitted to receiving module 4 according to conventional multiplex methods.

Receiving modules 4 are disposed in the region of a seat, so that they are easy to operate. Each person is able to select any usable transmission channel at receiving modules 4, and the corresponding useful signal, e.g., an audio signal, is able to be output via an installed loudspeaker or via a headphone set. For this purpose, a selector switch with whose aid an individual transmission channel is selectable as will be discussed later on is provided at receiving module 4.

Multi-channel transmission system 10 is usable in a vehicle such as a bus, on a train, an airplane, in an auditorium/conference facility or the like. Physically speaking, these have a flexible number of seats. According to the present invention, a receiving module 4 is provided in as many seats as possible or in all seats, in such a way that every passenger or listener is able to operate it easily.

When the configuration is changed, in particular when more transmission channels are required or if fewer signal sources are required in an existing multi-channel transmission system 10, multi-channel transmission systems have the inherent problem that no useful signal is available on a few of the transmission channels in multiplex signal 6. When selecting a transmission channel, it may therefore happen that the user triggers an unoccupied transmission channel. To avoid this problem, the present invention provides that receiving module 4 automatically enables only the transmission channels that are actually also occupied by a useful signal via a signal source 1. This yields the advantage that it is impossible to select transmission channels in multiplex signal 6 that do not transmit a useful signal. The unoccupied transmission channels are skipped or blocked according to the present invention.

In the following text, the mode of operation of the device for detecting an unoccupied transmission channel according to the present invention is explained in greater detail.

First of all, all useful signals 5 from individual signal sources 1 are linked to one another by central unit 2 (head end) and transmitted to each receiving unit 4 via multiplex signal 6. Central unit 2 then distributes useful signals 5 to all receiving modules 4 (seat modules), so that it is possible to select any desired useful signal individually at each seat module.

According to an example embodiment of the present invention, an encoder 8 is disposed in central unit 2. Encoder 8 has the task of encoding transmission channels of multiplex signal 6 not occupied by a useful signal with the aid of an identification. One very simple possibility for an identification is to encode the unused transmission channels of multiplex signal 6 by a direct voltage or a direct-voltage signal. As an alternative, a specific binary code, for example, is used for the encoding. The encodings are detected by individual receiving modules 4 with the aid of a corresponding decoder. A detected encoded transmission channel of multiplex signal 6 is then blocked for the selection via selector switch 21, as will be discussed in greater detail in the following text.

Furthermore, when selecting a transmission channel n, adjacent channel n+1 will also be checked as to whether an identification exists on this transmission channel. If this is not the case, then the one-after-the-next transmission channel n+2 is checked as well, so that possibly all encoded transmission channels in multiplex signal 6 are able to be identified.

If no further encoded transmission channel was found in multiplex signal 6, then the transfer via selector switch 21 is blocked. The user is then able to switch back only to previous transmission channel 6 for which no identification had been provided.

As already explained, a direct voltage may be coupled into unused transmission channels of multiplex signal 6 for the most basic encoding. Since the useful signals occur in the form of alternating-voltage signals, the identification in the form of a direct voltage is able to be detected by a correspondingly configured low pass, for example. Such encoding or decoding is therefore implementable with the aid of simple means in a cost-effective manner. Furthermore, for one, the great advantage results that no further disassembly work is required at individual receiving modules 4. For another, the hidden switch in receiving module 4 may be dispensed with since the selection of a transmission channel from each seat module 4 is automatically restricted.

FIG. 2 shows a circuit diagram of a central unit 2 in a schematic representation. Central unit 2 has four signal inputs 7, illustrated by way of example, to which corresponding signal sources 1 are connectable. An aspect of the example embodiment of the present invention is that an encoder 8 is provided by which unused transmission channels are able to be assigned an identification. As mentioned previously, the development of the identification preferably is realized by a direct-voltage signal or a direct voltage, which is coupled into the unused transmission channels. The combined useful signals are able to be tapped off as multiplex signal 12 at an output of central unit 2.

FIG. 3 shows a receiving module 4 in a schematic representation. The receiving module includes a device by which the useful signals on the individual transmission channels of multiplex signal 6 are received. Moreover, a selector switch 21 is provided on receiving module 4, with whose aid the individual receiving channels are selectable. In addition, receiving module 4 includes a decoder 24. Decoder 24 checks the individual transmission channels of multiplex signal 6 in order to determine whether they are encoded with an identification. It is checked, for example, whether a transmission channel in multiplex signal 6 was encoded with a direct-voltage signal. If such a transmission channel was detected, then selector switch 21 will be blocked so that the encoded transmission channel 6 is unable to be called up. Furthermore, a display 23 is disposed in receiving module 4, via which the current transmission channel is displayable, in particular. Additional information such as a sender's name or the signal source is able to be displayed on display 23. In addition, receiving module 4 has a connection 22 via which headphones, for instance, are connectable in order to be able to receive the useful signals without disturbing other passengers.

In an alternative embodiment of the present invention, instead of a multiplex signal 6, it is also possible to use another channel system order to offer a plurality of useful signals to a plurality of receiving modules 4.

What is claimed is:

1. A method for detecting an unoccupied transmission channel of a multi-channel transmission system having a plurality of transmission channels, useful signals transmitted by a variable number of signal sources being received by a central unit and distributed to a variable number of receiving modules on corresponding transmission channels, a transmission channel being individually selectable at each receiving module from among a predefined number of transmission channels, the method comprising:
  providing, by the central unit, only currently unoccupied transmission channels of the transmission system with an identification;
  checking at each receiving module as to which transmission channels include the identification; and
  skipping or blocking a calling up of those unoccupied transmission channels on the basis of the identification.

2. The method as recited in claim 1, further comprising: selecting a transmission channel n occupied by useful data, and checking transmission channel n+1 as to whether transmission channel n+1 includes the identification.

3. The method as recited in claim 2, wherein, if transmission channel n+1 includes the identification, a continuous check takes place on a next adjacent transmission channel n+2.

4. The method as recited in claim 1, wherein a further call-up of the transmission channels is blocked if no occupied transmission channel is found.

5. The method as recited in claim 1, wherein one of a direct voltage or a direct-voltage signal is used for the identification of an unoccupied transmission channel.

6. The method as recited in claim 1, wherein an optical identification is output for a selected transmission channel occupied by a useful signal.

7. The method as recited in claim 6, wherein the optical identification is one of a sequential number or a program name.

8. The method as recited in claim 1, wherein the identification of each of the unoccupied transmission channels is the same.

* * * * *